Feb. 20, 1940. J. T. CORRIGAN 2,191,340
HYDRAULIC TRANSMISSION MECHANISM
Filed June 6, 1938
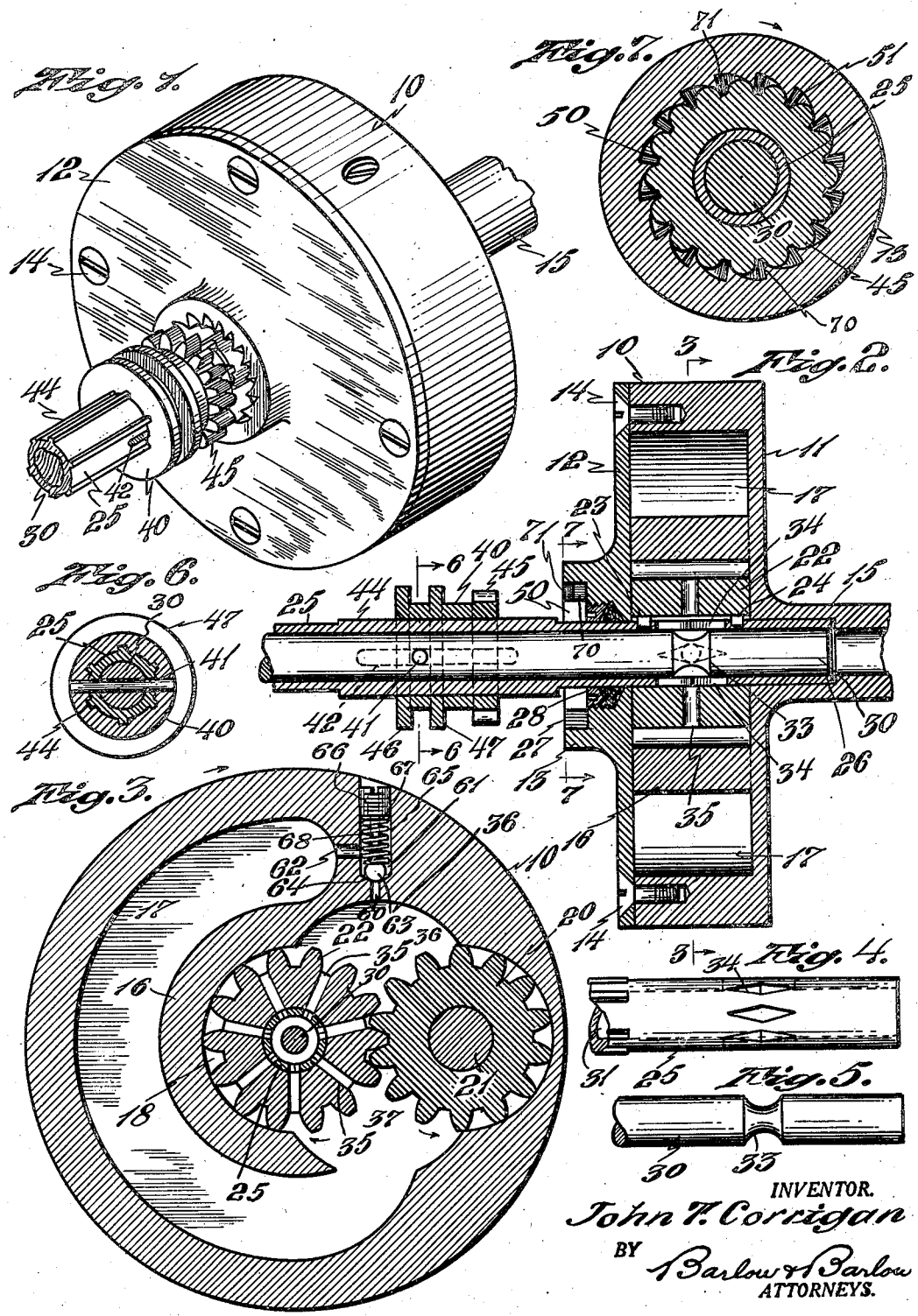
INVENTOR.
John T. Corrigan
BY Barlow & Barlow
ATTORNEYS.

Patented Feb. 20, 1940

2,191,340

UNITED STATES PATENT OFFICE 2,191,340

HYDRAULIC TRANSMISSION MECHANISM

John T. Corrigan, Newport, R. I.

Application June 6, 1938, Serial No. 212,115

7 Claims. (Cl. 192—61)

This invention relates to a power control and brake mechanism; and has for one of its objects to provide a fluid device for transmitting power from one rotatable member to another, and for controlling, varying or preventing relative rotation between said members.

Another object of the invention is to provide a device which may be interposed as a unit between a rotatable drive member and a rotatable member to be driven for effecting a transfer of power between the two rotatable members in a smooth, efficient and practically noiseless manner, and will dispense with the use of a mechanical clutch device and manually operable shift gears.

Another object of the invention is the provision of an improved fluid device for effecting connection and disconnection to a power means of a rotatable element to be driven, and also for controlling and/or changing the speed of the driven element whereby any speed ratio between the driven and driving elements may be obtained.

Another object of the invention is the provision of a combined fluid clutch and transmission for use with a power means, such as the power plant of a motor vehicle for connecting and controlling the transfer of power and relative rotation between the driving and driven elements without the necessity of shifting gears and the attendant loss in power and fuel, which objections have characterized the operation of the prior manually shiftable gear transmissions.

Another object of the invention is the provision of a fluid device of simple and efficient construction adapted for operatively connecting, controlling or preventing relative rotation between a driving and a driven member, and for effecting a direct mechanical connection of said members when rotation at the same speed is established.

Another object of the invention is the rendering ineffective of the fluid power transmission mechanism simultaneously with the direct mechanical connection of the driving and driven members after rotation of the two members at the same speed is established.

With these and other objects in view, the invention consists of certain novel features of construction, as will be more fully described, and particularly pointed out in the appended claims.

In the accompanying drawing:

Fig. 1 is a perspective view of a combined fluid power control and transmission device embodying the present invention;

Fig. 2 is a longitudinal central sectional view of the combined fluid power control and transmission mechanism shown in Fig. 1;

Fig. 3 is a transverse sectional view taken substantially on the line 3—3 of Fig. 2 looking in the direction of the arrows, showing the pumping gears in operating relation therein;

Fig. 4 is a fragmentary perspective view of a portion of the drive shaft from the power plant for the pump gear mechanism, showing the graduated ports for relieving pressure in the apparatus;

Fig. 5 is a fragmentary perspective view of a portion of the slide control valve showing the annular groove for regulating fluid flow through the ports in the drive shaft;

Fig. 6 is a transverse sectional view taken on the line 6—6 of Fig. 2; and

Fig. 7 is a transverse sectional view on the line 7—7 of Fig. 2 showing the power driving shaft in direct driving connection with the driven member.

In the operation of various mechanisms wherein a rotatable element is to be driven at variable speeds or intermittently connected to a rotatable power means, such as for example, in the power driven mechanism employed in the propulsion of a motor vehicle, it is customary to employ a mechanical clutch device and a power transmission unit incorporating manually shiftable gears, the unit being interposed between the power plant of the automobile and the propeller shaft for driving the rear wheels of the vehicle, and by shifting certain of the gears of the train to vary the speed of the propeller shaft and consequently that of the rear wheels driven thereby; and in order to eliminate the various objections accompanying the use of such prior power transmission mechanism, among which are the loss in power and fuel during the interval of shifting gears, the tendency of noisy engagement of gears during shifting, stalling of the motor through sudden overloading by improper coordination of the clutching and gear shifting operations, a combined power control and transmission device of the fluid type is provided in which the driven member comprises a hollow closed cylindrical casing divided by an arcuate partition concentric therewith into two separate, intercommunicating compartments, in one of which is disposed a pump gear mechanism; and in order to control the flow of fluid which is forced by a pump gear mechanism into a pressure chamber, and to regulate the pressure exerted by the pumped fluid therein in opposition to the path of travel of the pump gears whereby they are restrained in their movement to be either held against rotation or controlled in their speed so as to cause the casing to be rotated at any desired rate of speed by a drive shaft, there is also provided valve means concentric with one of the pump gears and the drive shaft and reciprocable within the bore of the drive shaft by means of a sleeve slidably mounted on the drive shaft exteriorly of the casing; and movable with the valve means is a passage thereon adapted to be moved into and out of coincidence with a plurality of circumferentially spaced graduated ports in the hollow wall portion of the drive shaft. These ports form communication for fluid with a plurality of radial fluid passages in one of the pump gears whereby fluid may be regulated in its escape from the fluid pressure chamber and caused to be discharged into the fluid supply at the inlet side of the pump gear mechanism, this control of the pressure exerted by the pumped fluid in the fluid chamber providing an effective and accurate means for controlling the speed of rotation of the driven casing in relation to that of the drive shaft or for holding the driving and the driven elements locked together for rotation at the same speed and to obtain direct mechanical drive of the elements, which last feature is obtained by providing a set of teeth on the sleeve for engagement with a set of teeth on the casing; and the following is a more detailed description of the present embodiment of this invention, illustrating the preferred means by which these advantageous results may be accomplished:

With reference to the drawing, 10 designates a closed hollow cylindrical metal casing which in the illustrated embodiment constitutes the driven member of my power transmission device, and is shown in Figs. 1 and 2 as being of a generally drum-like construction having an integral end wall 11, and a removable end wall 12 formed with a central hub 13 and secured to the casing in an oil tight joint by bolts 14. The end wall 11 is provided with a central hub 15 which is axially aligned with the hub 13 of the removable end wall and may be suitably connected to one end of the rotatable element to be driven (not shown), such as for example, the usual propeller shaft of a motor vehicle that is connected at its other end with the usual differential mechanism for driving the rear wheels of the vehicle. As shown in Fig. 3, an arcuate partition 16 concentric with the casing 10 and within the same divides the casing into separate compartments 17 and 18 that are filled with oil or other hydraulic fluid.

Carried within the casing 10 is a pump gear mechanism arranged in the compartment 18 for the purpose of building up pressure on the fluid, and this comprises a pump gear 20 which is loosely mounted for rotation upon a stub shaft 21 fixed to the end wall 11 of the casing. The gear 20 meshes with a similar pump gear 22 within the compartment 18 and positively driven by being keyed, as indicated by keys 23 and 24, to the tubular end portion of a drive shaft 25 which projects laterally of the partition 16 through the removable end wall 12 and the compartment 18 into an axial bore 26 in the hub 15 for the rotatable support of the terminal end of the shaft 25. The main body portion of the drive shaft 25 extends outwardly through the removable end wall 12 exteriorly thereof and has rotative bearing in a stuffing box 27 therein of conventional design maintained oil tight by the packing nut 28, while the exterior distal end extremity of the drive shaft 25 may be connected in a known manner to a suitable source of power, such as the power plant of a motor vehicle.

A slide valve device is associated with the above described gear pump mechanism and the drive shaft 25 for effecting connection or rotation of the casing 10 at variable speeds by the drive shaft, and this consists of a valve rod 30 manually controlled in a manner hereinafter described reciprocably mounted for sliding movement within a longitudinal bore 31 of the power drive shaft 25.

Extending circumferentially around an intermediate section of the valve rod 30 which is disposed within the casing 10 is an annular groove 33 for establishing communication with a plurality of graduated ports 34 in the tubular wall portion of the drive shaft 25 and this groove 33, upon manual shifting movement of the valve rod 30 to slide the same, is brought into a position in registry with the ports. As illustrated in Figs. 3 and 4, the ports 34 are disposed at equally spaced positions around the periphery of the shaft 25, and they may be formed of suitable shape to provide the desired tapering or cut-off action on the pumped fluid when closed by reciprocation of the manually controlled valve rod 30. As shown in the present embodiment, the ports 34 each are of diamond-shaped formation and, in conjunction with a corresponding number of radial conduits or passages 35 in the pump gear 22, they form free flow fluid communication between the arcuate pockets or chambers 36 and 37 in the casing 10 which extend laterally of the pump gear compartment 18 at opposite sides of the pumping zone of the pump gears 20 and 22 in the path of travel of the pumped fluid at either side thereof, whereby in the opened position of the valve rod 30 the oil or hydraulic fluid that has been forced up into the upper pocket or fluid pressure chamber 36 during rotation of the pump gears 20 and 22 can pass to or escape out of the fluid pressure chamber 36 through one or more of the passages 35 of the gear 22 to be discharged into the lower pocket 37 on the inlet side of the pump gears where this effluent may intermix with the fluid supply. The conduits 35 each consist of a cylindrical bore, the exterior end opening of which preferably is disposed at the portion of the circumference of the gear 22 that connects two adjacent teeth.

A pressure relief valve device is provided having a bore 60 communicating at one end with the fluid pressure chamber 36 and opening at its other end into an enlarged cylindrical bore 61 which is provided with outlet passage 62 communicating with the chamber 17. A ball valve member 63 in the bore 61 engages at its bottom surface against a spherical valve seat 64 at the inner end of the bore 60 and is held against the seat by a spring 65. A set screw 66 is threaded into the top end of the bore 61, and the bottom end of the screw is of stepped formation to provide an annular portion 67 adapted to engage the upper end of the spring 65 for adjusting the opening pressure of the ball 63 and a pin extension 68 co-axial with the screw. Thus, the ball 63 will rise and be moved off the valve seat 64 by the fluid to relieve the fluid pressure within the chamber 36 when the pin 68 is withdrawn from engagement with the ball 63 and the pressure of the fluid exceeds that produced by the spring 65 to seat the ball 63. To get maximum load of the device the ball 63 may be locked in its seat by screwing down the set screw 66 sufficiently until the end of the pin 68 engages the top surface of the ball.

In order to provide a means whereby the valve rod 30 may be longitudinally reciprocated in the hollow portion of the drive shaft 25, and shifting movement of the valve rod accomplished, to control the speed of the casing 10 with respect to the drive shaft 25, a sliding sleeve 40 is provided which is mounted on the drive shaft 25 and the sleeve is attached to the valve rod 30 by means of a pin 41 extending cross-wise thereof arranged for longitudinal sliding movement in a pair of elongated slots 42 formed in the opposite side wall portions of the hollow end portion of the drive shaft 25. The sleeve 40 is arranged for longitudinal sliding movement along the drive shaft 25 and is piloted during such movement by the splines 44 which provide a positive drive of the sleeve 40 and the gear 45 carried at one end thereof, the purpose of which will be presently described. Shifting of the sliding sleeve 40 is accomplished through the usual gear shift lever operating shifting forks (not shown) which are attached to suitable shafts, the arms of these forks being disposed in an embracing relation with the sleeve 40 between a pair of spaced annular flanges 46 and 47 adjacent the other end of the sliding sleeve.

In order to provide a direct drive of the casing 10 by the drive shaft 25 after the casing has been brought up to synchronous speed with the drive shaft, there is provided a mechanical clutch arrangement and is shown as consisting of an annular recess 50 formed in the end face of the hub 13 of the removable end wall member 12, and a plurality of teeth 51 formed in the inner peripheral face of the hub 13 bounding the sides of this recess, the leading side face of each of the teeth 51 being formed with an inner surface 70 lying in a radial plane and an adjoining surface 71 inclined to the surface 70 in advance thereof to be initially engaged laterally by the teeth of the gear 45 upon continued longitudinal movement of the sliding sleeve 40 to the right of Fig. 2 after the fluid by-pass ports 34 have been entirely cut off by the valve rod 30 during previous movement in the same direction for placing the fluid in the fluid chamber 36 under its maximum pressure. The surface 70 is so arranged that when engaged by the gear teeth 45, the sleeve and the casing make interlocking connection and prevent the danger of throwing out of engagement of the member should the casing turn at a faster speed than the drive shaft 25.

The operation of the device will be apparent from the foregoing description and is as follows: When the valve rod 30 is in the position shown in Fig. 2 power to be transmitted to the rear axle of the vehicle or other member to be driven is supplied from the engine to cause turning of the hollow or tubular drive shaft 25 to rotate the pump gear 22 meshing with the gear 20 to pump oil into a chamber 36 from which the pumped oil is forced back through the radial fluid passages 35 in the gear 22 and through the ports 34 and the annular groove 33 on the valve rod back into the pocket 37 of the compartment 18 of the casing 10. This action takes place when the power transmission unit is in an idling position so that there will be no driving connection or movement of the vehicle.

In order to connect the drive shaft 25 into driving engagement with the casing 10 the sliding valve rod 30 is manually shifted to the right of Fig. 2 in order to close off the fluid flow through the ports 34. This movement of the valve rod 30 is controlled by sliding the splined sleeve 40 by the usual gear shift lever of the vehicle (not shown) in which movement of the valve rod 30 towards the right gradually cuts off flow of oil through the graduated ports 34 and the fluid passages 35 in the gear 22, thus progressively increasing the speed of the vehicle of rotation of the casing and consequently as oil flow between the pockets 36 and 37 is restricted by closing of the valve 30, pressure is increased in the upper pocket 36 in the upward travel of the fluid therein in opposition to the path of movement of the pump gears 20 and 22, which action in turn increases pressure thereon to resist the turning of the gears consequently sets up a torque to cause rotation of the transmission casing 10. This turning of the casing 10 increases in speed until the valve 30 has been completely closed, thereby preventing by-passing of the oil through the ports 34 and the passages in the gear 22, thus controlling or preventing rotation of the pump gears 20 and 22 which upon being unable to further force oil into the upper pocket 36, thus drives the transmission casing around in synchronism with the speed of the drive shaft 25. However, in order to preclude a possible slippage of the power shaft 25 and the casing 10 upon reaching synchronous speed due to leakage of the fluid, a mechanical coupling of the drive shaft 25 with the casing is obtained upon continued motion to the right of Fig. 2 of the sliding sleeve 40 which will cause the teeth of the gear 45 to mesh with the teeth of the internal gear 51, whereby a direct drive connection results with the casing 10, the rotation of which will be clockwise in the direction of the arrow as viewed in Fig. 7.

It will thus be apparent in view of the foregoing construction that the speeds of the drive and driven members may be controlled at desired operating speeds quietly and easily, and that the entire mechanism is simple in construction and positive in action and capable of transmitting steady power to the driven member, thus eliminating the losses in power and fuel that characterize the present gear transmission during the interim of shifting gears.

While in the present embodiment there is not shown the device as being provided with a reverse speed mechanism, it is of course understood that such devices are well known and may be constructed in various manners, such as for example, by the employment of a train of gears for coupling the propeller shaft with the differential, and having a reverse gear shiftable with respect to the parts associated therewith to effect rotation of the differential and rear wheels of the motor vehicle in the opposite direction to the rotation of the casing 10 and the shaft 25 indicated in Figs. 3 and 7, when the position of the valve rod 30 is manually moved to the left of Fig. 2, and with respect to the drive shaft 25. When the valve rod 30 is thus moved the circumferential groove 33 therein will control or cut off passage of fluid through the ports 34 to the fluid passages 35 of the gear to cause rotation of the casing 10 at the speed differential existing between the driven and driving members, and at the same time causing engagement and connection of the reverse gear with the other gears of the train. Shifting movement of the valve rod 30 to the right of Fig. 2 then will disconnect the reverse gear and establish connection of the propeller shaft with the casing for forward movement of the vehicle under the direct control valve.

The foregoing description is directed solely towards the construction illustrated, but it is to be understood that the privilege is reserved of resorting to all the mechanical changes to which the device is susceptible, the invention being defined and limited only by the terms of the appended claims.

Having thus described the invention, what is claimed as new and desired to secure by Letters Patent is:

1. In a device of the class described, a hollow closed cylindrical casing containing fluid, an arcuate partition member within the casing concentric therewith forming two separate intercommunicating compartments, a drive shaft having a hollow end portion extending into the casing through one of the compartments, the portion of the shaft within the compartment being provided with a plurality of circumferentially spaced graduated ports around the periphery thereof, intermeshing pump gears in one compartment, one of said gears being operatively connected with the drive shaft, means for connecting the casing to the other gear, pockets in the casing associated with the pump gear compartment at opposite sides thereof and spaced above and below the entrance and discharge passages of the pump gears, passages in one of said pump gears forming fluid communication between the two pockets, and speed controlling valve means slidable within the drive shaft and one gear adapted to be operated for controlling the flow of fluid between the two pockets whereby the pressure of the fluid as it is carried upwardly into the upper pocket during rotation of the gears will act in opposition to the path of movement of the gears whereby they may be held against or controlled in rotation to cause the casing to rotate with the drive shaft.

2. In a device of the class described, a hollow closed cylindrical casing containing fluid, an arcuate partition member within the casing concentric therewith forming two separate intercommunicating compartments, a drive shaft having a hollow end portion extending into the casing through one of the compartments, the portion of the shaft within the compartment being provided with a plurality of circumferentially spaced graduated ports around the periphery thereof, intermeshing pump gears in one compartment, one of said gears being operatively connected with the drive shaft, means for connecting the casing to the other gear, pockets in the casing associated with the pump gear compartment at opposite sides thereof and spaced above and below the entrance and discharge passages of the pump gears, passages in one of said pump gears forming fluid communication between the two pockets, and speed controlling valve means slidable within the drive shaft and one gear adapted to be operated for controlling the flow of fluid between the two pockets whereby the pressure of the fluid as it is carried upwardly into the upper pocket during rotation of the gears will act in opposition to the path of movement of the gears whereby they may be held against or controlled in rotation to cause the casing to rotate with the drive shaft, said speed controlling valve means comprising a valve member reciprocable within the hollow end portion of the drive shaft and provided with an annular circumferential groove adapted to register with the ports in said drive shaft upon selected sliding movement of said valve rod.

3. In a device of the class described, a hollow closed cylindrical casing containing fluid, an arcuate partition member within the casing concentric therewith forming two separate intercommunicating compartments, a drive shaft having a hollow end portion extending into the casing through one of the compartments, the portion of the shaft within the compartment being provided with a plurality of circumferentially spaced graduated ports around the periphery thereof, intermeshing pump gears in one compartment, one of said gears being operatively connected with the drive shaft, means for connecting the casing to the other gear, pockets in the casing associated with the pump gear compartment at opposite sides thereof and spaced above and below the entrance and discharge passages of the pump gears, said drive gear provided with a plurality of radial passages having a cylindrical bore open at one end between a pair of teeth, and speed controlling valve means slidable within the drive shaft and one gear adapted to be operated for controlling the flow of fluid between the two pockets whereby the pressure of the fluid as it is carried upwardly into the upper pocket during rotation of the gears will act in opposition to the path of movement of the gears whereby they may be held against or controlled in rotation to cause the casing to rotate with the drive shaft.

4. In a device of the class described, a hollow closed cylindrical casing containing fluid, an arcuate partition member within the casing concentric therewith forming two separate intercommunicating compartments, a drive shaft having a hollow end portion extending into the casing through one of the compartments, the portion of the shaft within the compartment being provided with a plurality of circumferentially spaced graduated ports around the periphery thereof, intermeshing pump gears in one compartment, one of said gears being operatively connected with the drive shaft, means for connecting the casing to the other gear, pockets in the casing associated with the pump gear compartment at opposite sides thereof and spaced above and below the entrance and discharge passages of the pump gears, passages in one of said pump gears forming fluid communication between the two pockets, speed controlling valve means slidable within the drive shaft and one gear adapted to be operated for controlling the flow of fluid between the two pockets whereby the pressure of the fluid as it is carried upwardly into the upper pocket during rotation of the gears will act in opposition to the path of movement of the gears whereby they may be held against or controlled in rotation to cause the casing to rotate with the drive shaft, said speed controlling valve means comprising a valve member reciprocable within the hollow end portion of the drive shaft and provided with an annular circumferential groove adapted to register with the ports in said drive shaft upon selected sliding movement of said valve rod, and means for moving said reciprocable valve member to position the annular groove thereon into and out of coincidence with the graduated ports in the drive shaft.

5. A variable fluid transmission device comprising a rotatable driving member, a rotatable casing to be driven at various speeds by said driving member, said casing being divided into two communicating compartments, one of which contains fluid and forms a supply reservoir therefor, intermeshing pump gears in the other compartment, one of said pump gears being operatively connected to said driving member for rotation therewith, means for connecting the casing to the other of said pump gears, a chamber in a wall of said pump gear compartment opening toward the same into which fluid is pumped during normal rotation of said pump gears by said driving member and retained therein under pressure during rotation of said casing, liquid conveying passages in one of said pump gears arranged to effect delivery of streams of fluid under pressure from said chamber into the source of fluid supply at the inlet zone of said pump gears, valve means operative upon manual movement to various positions to establish a communication through which fluid under pressure is discharged from said chamber through said passages to the inlet zone of said pump gears, and to effect a reduction in pressure of the fluid in said chamber, said pump gears being subject to the opposing pressure of the pumped fluid in said chamber as determined by the position of said valve means to effect the operation and control of the speed of said casing, and means providing a bore between said source of fluid supply and said fluid pressure chamber, and a normally closed spring pressed ball valve located in said bore operable to open position in response to a predetermined fluid pressure in said fluid pressure chamber, and means located in said bore for locking said ball valve in its seat when maximum load of the device is to be obtained.

6. In a device of the class described, in combination, a hollow driving member, a support constituting the driven member and rotatable about the same axis as the said driving member, a pair of intermeshing fluid pumping elements, one of said elements being fixedly connected with the driving member for rotation therewith, the other of said pump elements being carried by the support for rotation with respect thereto and for bodily rotation therewith, a wall member on the support housing said gears and having a portion spaced therefrom to form a fluid receiving chamber between the said pump elements, the peripheries of the oppositely disposed portions of the said pump elements that approach and enter into meshing engagement with each other constituting portions of the walls of said chamber, there being radial passages leading through one of said pump elements and the said driving member to constitute fluid outlets from said chamber, the fluid when the driving member is rotated and the support is idle, being circulated by said pump elements into said chamber and from the chamber through said outlets, there being graduated ports in the driving member communicating with the said radial passages, and means slidable within the said hollow driving member for controlling the flow of fluid through said outlets and ports and to trap the fluid in said chamber and cause pressure to be increased upon the trapped fluid as fluid is forced into said chamber during rotation of said pump elements whereby the pressure of the trapped fluid will act to oppose the rotation of said pump elements whereby they will be held against or controlled in rotation to cause the support to rotate with the driving member.

7. In a device of the class described, a hollow closed casing containing fluid, an arcuate partition member within the casing concentric therewith and dividing the casing into two separate inter-communicating compartments, one of which serves as a fluid supply chamber and the other providing a recess constituting a housing for the pump gears, a driving shaft concentric with the casing and rotatable relative thereto, said shaft having a hollow end portion extending into the casing and through said recess, a plurality of graduated ports in the hollow portion of said driving shaft within said recess, a pair of intermeshing pump gears in said recess, one of said gears being attached to said shaft for rotation therewith to drive the other gear, the other gear being carried by the casing for rotation with respect thereto and for bodily rotation therewith, there being a fluid receiving chamber between said partition member and the oppositely disposed portions of the gears that approach and intermesh with each other, radial passages in said drive gear for registry with said ports during rotation of said gear by the driving shaft to constitute fluid outlets from said chamber, the fluid when the driving shaft is rotated and the casing is idle being circulated by the said gears into said chamber and from the chamber through said outlets and ports, and a valve device slidable within the hollow portion of said shaft to be manually operated at will for controlling the flow of fluid through said outlets to trap the fluid in said chamber to cause the pressure of the fluid to be increased upon the fluid thus trapped during rotation of the gears whereby the pressure of the trapped fluid will act to resist the normal pumping movement of the gears whereby they may be held against or controlled in their rotation to cause the casing to rotate with said driving shaft.

JOHN T. CORRIGAN.